(12) United States Patent
Yeh

(10) Patent No.: US 9,709,762 B2
(45) Date of Patent: Jul. 18, 2017

(54) RETENTION MEMBER FOR POSITIONING OPTICAL MODULE

(71) Applicant: FOXCONN INTERCONNECT TECHNOLOGY LIMITED, Grand Cayman (KY)

(72) Inventor: Cheng-Chi Yeh, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 32 days.

(21) Appl. No.: 14/619,091

(22) Filed: Feb. 11, 2015

(65) Prior Publication Data

US 2015/0309273 A1 Oct. 29, 2015

(51) Int. Cl.
*G02B 6/42* (2006.01)
(52) U.S. Cl.
CPC ......... *G02B 6/4292* (2013.01); *G02B 6/4284* (2013.01); *G02B 6/428* (2013.01); *G02B 6/4257* (2013.01); *G02B 6/4269* (2013.01)
(58) Field of Classification Search
None
See application file for complete search history.

(56) References Cited

U.S. PATENT DOCUMENTS

| 6,851,867 | B2 * | 2/2005 | Pang | G02B 6/3825 |
| | | | | 385/134 |
| 7,665,904 | B2 * | 2/2010 | Yu | G02B 6/4201 |
| | | | | 385/135 |
| 9,316,797 | B2 * | 4/2016 | Ista | G02B 6/3893 |
| 2005/0201074 | A1 * | 9/2005 | Huang | G02B 6/4292 |
| | | | | 361/801 |
| 2011/0080008 | A1 * | 4/2011 | Teo | H01R 13/6272 |
| | | | | 292/197 |
| 2014/0355938 | A1 * | 12/2014 | Yeh | G02B 6/4228 |
| | | | | 385/92 |

FOREIGN PATENT DOCUMENTS

CN 102141654 B 8/2011

* cited by examiner

*Primary Examiner* — Tina Wong
(74) *Attorney, Agent, or Firm* — Wei Te Chung; Ming Chieh Chang

(57) ABSTRACT

A retention member (100) includes a seat (1), a locking member (2) and a protecting member (22) assembled on the seat (1), the locking member (2) has a body portion (20), the protecting member (22) has a push portion (220) higher than the body portion (20) of the locking member (2), when the push portion (220) is rotated, the push portion (220) drives the locking member (2) to be rotated and to be released.

19 Claims, 5 Drawing Sheets

RETENTION MEMBER FOR POSITIONING OPTICAL MODULE

BACKGROUND OF THE INVENTION

1. Field of the Invention

The present invention relates generally to a retention member, and more particularly to a retention member for positioning an optical module and assembling the optical module to an electrical connector.

2. Description of Related Art

Chinese patent number 102141654A issued to Xie on Aug. 3, 2011 discloses a conventional electrical connector for positioning an optical module. The optical module converts optical signals to electrical signals and then the electrical signals are transferred to the electrical contacts of the electrical connector. The electrical connector defines a retention member, a plurality of electrical contacts received in the retention member and a cover assembled on the retention member. The cover can be rotated between an open position and a closed position to position the optical module. The retention member includes a slot. The cover includes a shaft received in the slot to mount the cover on the retention member. When assemble the optical module, the operator needs to open the cover and put the optical module on the retention member and then close the cover, the operation is complicated. And the shaft is easily loosened due to a long time used, which will affect the force that the cover presses on the optical module.

Hence, it is desirable to provide an improved electrical connector to overcome the aforementioned disadvantages.

SUMMARY OF THE INVENTION

Accordingly, an object of the present invention is to provide a retention member for positioning optical module and assembling the optical module to an electrical connector.

According to one aspect of the present invention, a retention member for being positioned on a substrate for mounting an optical module and a fiber assembly aligning with the optical module and comprises a seat, a locking member assembled on the seat for positioning the seat on the substrate and a protecting member assembled on the seat, the locking member has a body portion, the protecting member has a push portion higher than the body portion of the locking member, when the push portion is rotated, the push portion drives the locking member to be rotated and to be released.

Other objects, advantages and novel features of the invention will become more apparent from the following detailed description when taken in conjunction with the accompanying drawings, in which:

DETAILED DESCRIPTION OF THE INVENTION

Reference will now be made to the drawings to describe the present invention in detail. The present invention is an improved invention according to a U.S. patent application Ser. No. 14/162,762, which filed on Jan. 24, 2014, and related to another application Ser. No. 14/555,514 filed Nov. 26, 2014.

Figure 1:
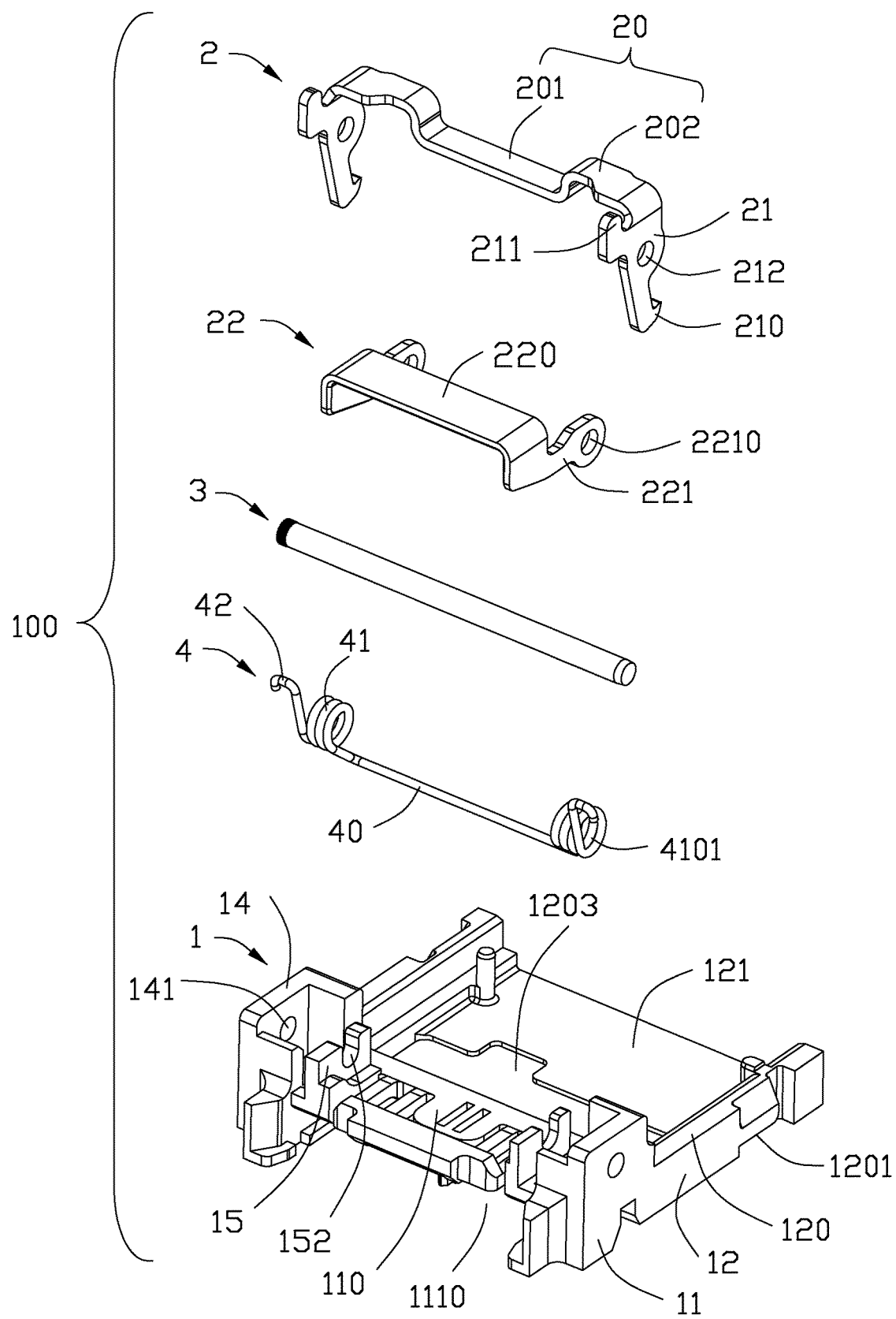
FIG. 1 is an exploded view of a retention member according to the present invention.
Figure 2:
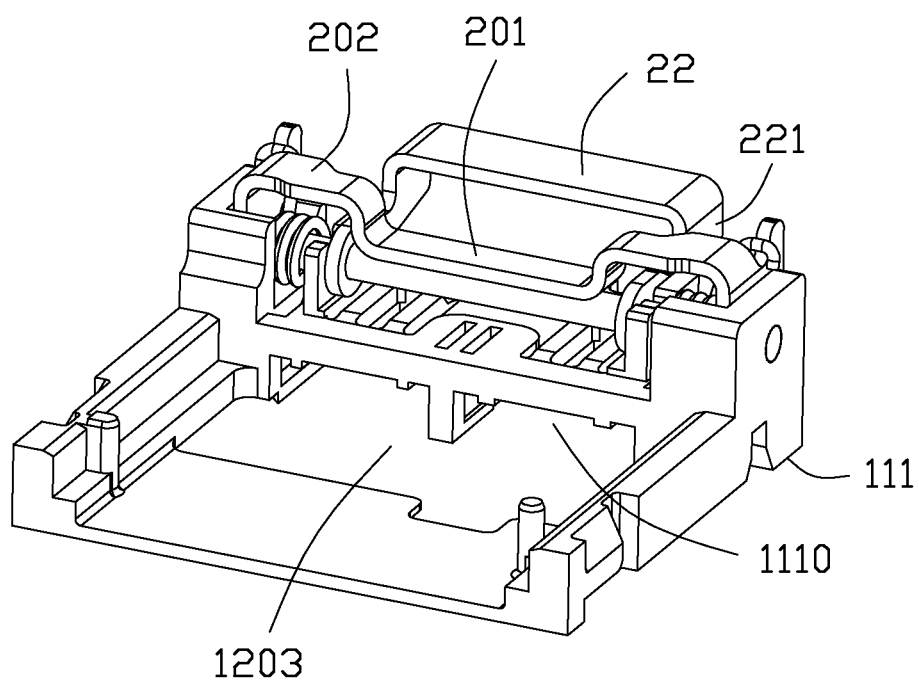
FIG. 2 is an assembled view of the retention member as shown in FIG. 1.
Figure 3:
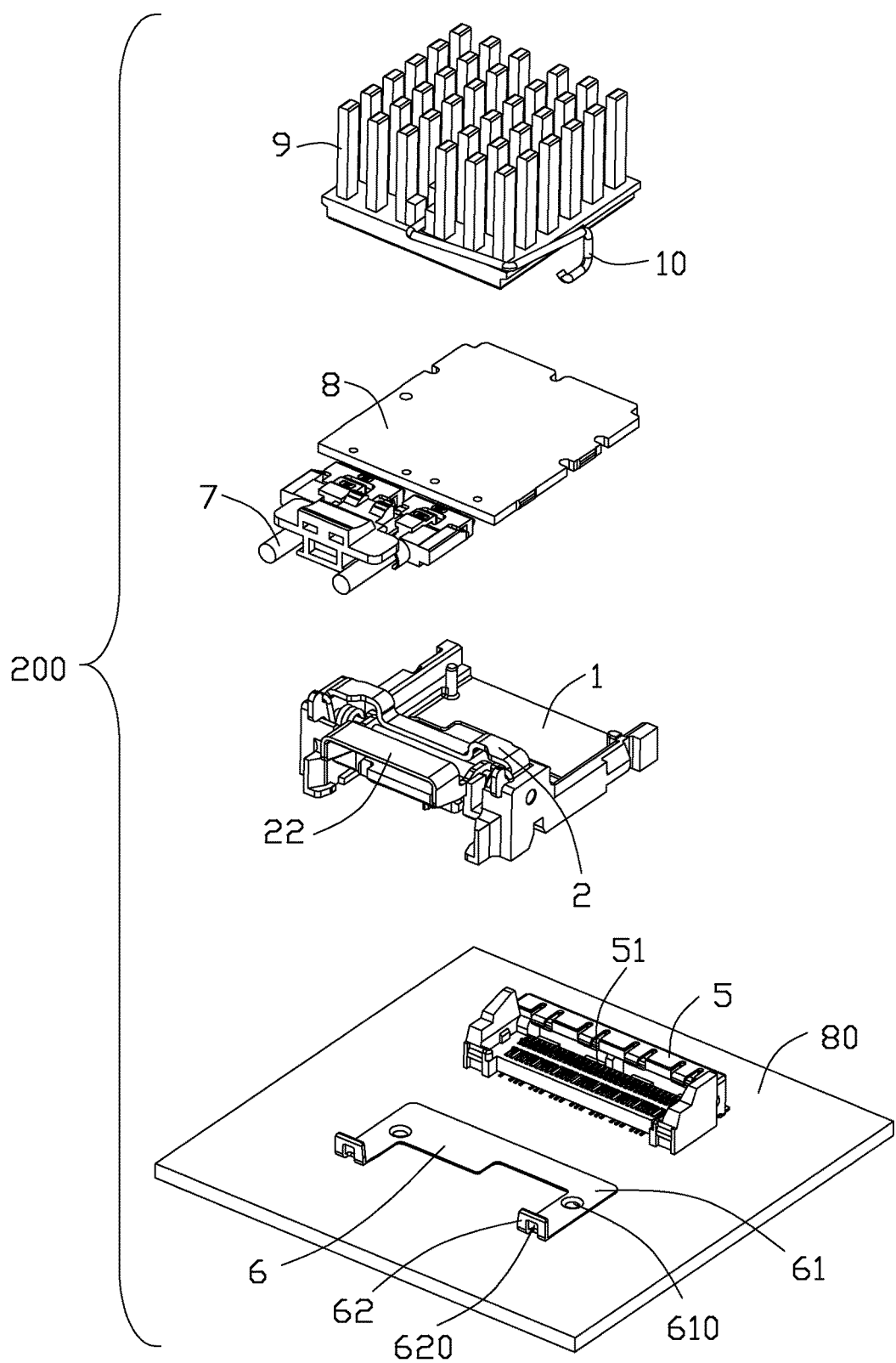
FIG. 3 is an exploded view of an electrical connector assembly which using the retention member.

Referring to FIGS. 1-3, a retention member 100 of the present invention is used for positioning an optical module 8. The retention member 100 includes a seat 1, a locking member 2 assembled to the seat 1, a rod member 3 assembled to the seat 1 for positioning the locking member 2 to the seat 1, a spring 4 and a protecting member 22 assembled to the rod member 3.

Referring to FIGS. 1, 2 and 4-5, the seat 1 is made of insulating material and includes a support portion 12 and a head portion 11 extending from the support portion 12. The support portion 12 includes a bottom wall 121 and a pair of sidewalls 120 extending from opposite ends of the bottom wall 121. The bottom wall 121 and the pair of sidewalls 120 form a receiving space 1203 for receiving the optical module 8. The sidewall 120 includes a block 1201. The head portion 11 defines a top surface 110 higher than the bottom wall 121, a bottom surface 111 opposite to the top surface 110, a pair of through holes 131 penetrating the top surface 110 and the bottom surface 111, a plurality of retention walls 14 and support walls 15 extending upwardly from the top surface 110, a pair of recesses 1110 recessed from the bottom surface 111. The pair of recesses 1110 is used for receiving a pair of fiber assembly 7. One of the retention walls 14 faces to one of the support wall 15, the retention wall 14 defines a hole 141, the support wall 15 correspondingly defines a groove 152.

The spring 4 includes a main portion 40, a pair of assembling portions 41 extending from opposite ends of the main portion 40 and a pair of hook portions 42 extending from the pair of assembling portions 41. Each of the assembling portions 41 defines a slot 4101 for assembling the rod member 3.

The locking member 2 is made of metal material and includes a body portion 20, a pair of locking portions 21 extending from two opposite ends of the body portion 20 and a protruding portion 211 extending from the locking portions 21. The body portion 20 includes a middle portion 201 and a pair of end portions 202 extending upwardly from the middle portion 201. Each of the locking portions 21 includes a positioning hole 212 and a locking end 210 at the end of the locking portion 21. The protecting member 22 includes a push portion 220 and a pair of retention portions 221 extending from two opposite ends of the push portion 220. Each of the retention portions 221 defines a retention hole 2210 at a free end thereof. The push portion 220 is substantially in a horizontal plane, the retention portions 221 are bent downwardly from the lateral sides of the push portions 220 and extending forwardly.

After the retention member 100 is assembled, the rod member 3 goes through the retention hole 2210 of the retention portions 221 of the protecting member 22 and the slot 4101 of the assembling portions 41 of the spring 4 to assemble the rod member 3, the protecting member 22 and the spring 4 together, the locking portions 21 of the locking member 2 goes into the through holes 131 of the seat 1, and the rod member 3 goes through the holes 141 of the retention walls 14 and the positioning holes 212 of the locking member 2, the hook portions 42 hook with the protruding portion 211 of the locking member 2, thus the rod member 3, the spring 4, the locking member 2, the protecting member 22 and the seat 1 are assembled together. The main portion 40 of the spring 4 is supported on the seat 1. The rod member 3 is received in the groove 152 of the support wall 15 to make the rod member 3 be securely positioned on the seat 1.

Referring to FIG. 2, when the protecting member 22 is at an initial state, the body portion 20 of the locking member 2 is lower than the push portion 220 of the protecting member 22. The middle portion 201 locates between the pair of retention portions 221 of the protecting member 22, the end portions 202 is higher than the retention portions 221 of the protecting member 22.

Figure 4:
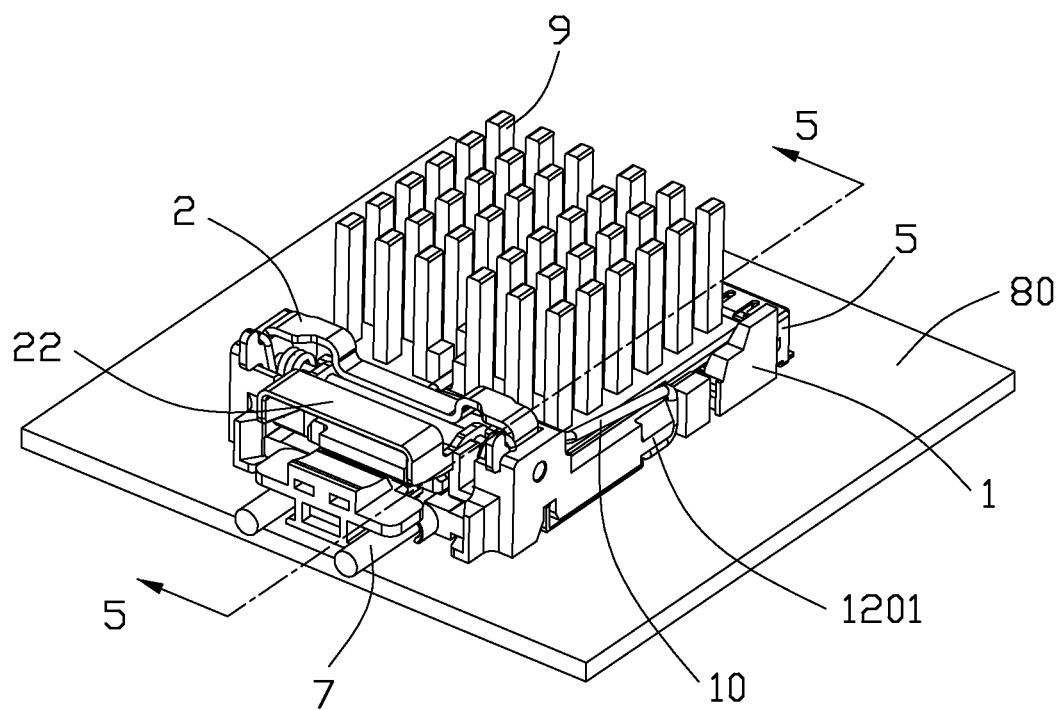
FIG. 4 is an assembled view of the electrical connector assembly and a substrate.
Figure 5:
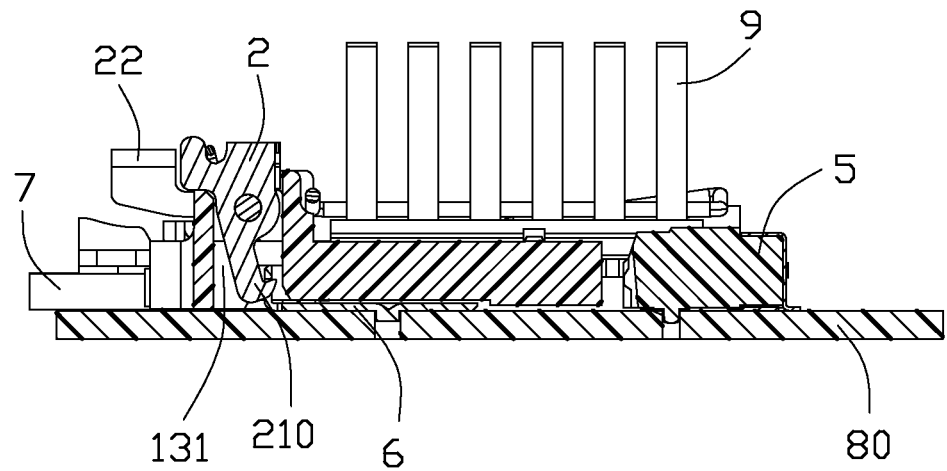
FIG. 5 is a cross-sectional view along line 5-5 as shown in FIG. 4.

Referring to FIGS. 3-5, an electrical connector assembly 200 which uses the retention member 100 includes a pair of fiber assemblies 7 assembled to the retention member 100, a heat sink 9 put on the optical module 8, a lever 10 assembled to the retention member 100 for positioning the heat sink 9, an electrical connector 5 set on the substrate 80 for electrically connecting with the optical module 8 and an interlock member 6 assembled on the substrate 80 for engaging with the locking member 2.

The electrical connector 5 includes a plurality of contacts 51. The interlock member 6 includes a main portion 61 and a pair of interlock portions 62 extending from the main portion 61. The main portion 61 defines a pair of posts 610 for positioning itself on the substrate 80. Each of the interlock portions 62 defines an aperture 620 for interlocking with the locking end 210 of the locking member 2.

When the retention member 100 is used, the optical module 8 is received in the receiving space 1203 of the seat 1, the heat sink 9 presses on the optical module 8, the lever 10 presses on the heat sink 9 and interlocks with the blocks 1201, the fiber assemblies 7 are received in the pair of recesses 1110 of the seat 1 to align with the optical module 8 to transfer the optical signal to the optical module 8. So, an OE module includes the retention member 100, the fiber assemblies 7, the optical module 8, the heat sink 9 and the lever 10 is completely assembled. And then insert the OE module to the electrical connector 5 in an inclined direction and press the OE module to a horizontal position, to make the locking ends 210 of the locking member 2 to interlock with the interlock portions 62 of the interlock member 6, thus, to make a robust electrical connection between the optical module 8 and the electrical connector 5.

When need to remove the optical module 8, rotate the push portion 220 of the protecting member 22 toward the locking member 2, during this process, the protecting member 22 will forwardly push the locking member 2 to rotate to be released from the interlock member 6, and then can remove the optical module 8.

In this embodiment, the locking ends 210 of the locking member 2 hooks with the interlock member 6 set on the substrate 80, also the locking ends 210 of the locking member 2 can hook with the substrate 80 directly or hook with other members to make the optical module 8 contact with the contacts 51 of the electrical connector 5.

The body portion 20 of the locking member 2 is lower than the push portion 220 of the protecting member 22 which can prevent releasing of the locking member 2 in an unexpected condition.

While the preferred embodiments in accordance with the present invention has been shown and described, equivalent modifications and changes known to persons skilled in the art according to the spirit of the present invention are considered within the scope of the present invention as defined in the appended claims.

What is claimed is:

1. An optoelectronics assembly comprising:
   a retention member for mounting to a printed circuit board and including:
   a seat forming an upward facing receiving space and at least a forwardly facing recess;
   a locking member assembled on the seat for positioning the seat on the printed circuit board; wherein
   the retention member has a protecting member assembled on the seat, the locking member has a body portion, the protecting member has a push portion higher than the body portion of the locking member, when the push portion is rotated, the push portion drives the locking member to rotate and to be released; and both the locking member and the protecting member are pivotal about a same axis; and
   an optical module received in said receiving space, and a fiber assembly received in said recess.

2. The optoelectronics assembly as claimed in claim 1, wherein the retention member further has a rod member assembled to the locking member and the protecting member and a spring assembled to the rod member, the spring interlocks with the locking member.

3. The optoelectronics assembly as claimed in claim 2, wherein the locking member has a pair of locking portions extending from opposite ends of the body portion and a locking end at the end of each of the locking portions, each of the locking portions has a protruding portion and a positioning hole, the rod member is assembled to the positioning hole and the spring interlocks with the protruding portion.

4. The optoelectronics assembly as claimed in claim 3, wherein the protecting member further includes a pair of retention portions extending from opposite ends of the push portion, each of the retention portions defines a retention hole for assembling the rod member.

5. The optoelectronics assembly as claimed in claim 4, wherein the spring includes a main portion, a pair of assembling portions extending from opposite ends of the main portion and a pair of hook portions extending from the pair of assembling portions, each of the assembling portions defines a slot for assembling the rod member, the main portion is supported on the seat, the hook portions interlock with the protruding portions of the locking member.

6. The optoelectronics assembly as claimed in claim 4, wherein the body portion of the locking member includes a middle portion and a pair of end portions extending upwardly from the middle portion, the middle portion locates between the pair of retention portions of the protecting member, the end portions is higher than the retention portions of the protecting member.

7. The optoelectronics assembly as claimed in claim 1, wherein the seat includes a support portion and a head portion extending from the support portion, the support portion includes a bottom wall and a pair of sidewalls extending from opposite ends of the bottom wall, the bottom wall and the pair of sidewalls form said receiving space for receiving the optical module.

8. The optoelectronics assembly as claimed in claim 7, wherein the head portion has a pair of through holes penetrating the top surface and the bottom surface to permit the locking portions of the locking member going through.

9. The optoelectronic assembly as claimed in claim 2, wherein the spring is pivotal about said same axis.

10. An optoelectronics assembly, comprising:
a seat having a space to receive an optical module and a recess to receive a fiber assembly;
a locking member assembled on the seat for positioning the seat on a substrate, the locking member having a body portion;
a rod member assembled to the seat and the locking member for positioning the locking member on the seat;
a spring disposed on the seat and constantly urging the locking member; and
a protecting member assembled on the seat, the protecting member having a push portion higher than the body portion of the locking member, when the push portion being rotated, the push portion driving the locking member to be rotated and to be released; wherein
the locking member and the protecting member share a same pivot shaft defined by said rod member.

11. The optoelectronics assembly as claimed in claim 10, wherein the locking member has a pair of locking portions extending from opposite ends of the body portion and a locking end at the end of each of the locking portions, each of the locking portions has a protruding portion and a positioning hole, the rod member is assembled to the positioning hole and the spring interlocks with the protruding portion.

12. The optoelectronics assembly as claimed in claim 10, wherein the body portion of the locking member has a middle portion and a pair of end portions extending upwardly from the middle portion, the protecting member further includes a pair of retention portions extending from opposite ends of the push portion for assembling to the rod member, the middle portion locates between the pair of retention portions of the protecting member, the end portions is higher than the retention portions of the protecting member.

13. The optoelectronic assembly as claimed in claim 10, wherein said spring is assembled upon the rod member and share the same pivot shaft with both said locking member and said protecting member.

14. An optoelectronic assembly comprising:
a printed circuit board;
a retention member including:
a seat positioned upon the printed circuit board and forming a space to receive an optical module, and a recess to receive a fiber assembly;
a locking member pivotally mounted upon the seat and defining a locking end lockable to an interlocking portion on said printed circuit board;
a protecting member positioned by an outer side of the locking member and moveably mounted to the seat so as to prevent inadvertent rotation of the locking member; wherein
the protecting member is moveable between a first/horizontal position where the protecting member is not engaged with the locking member, and a second/upstanding position where the protecting member is engaged with the locking member to urge the locking member to move for unlocking; wherein
said protecting member is pivotal with regard to the seat, and both the locking member and the protecting member are pivotal about a same axis.

15. The optoelectronic assembly as claimed in claim 14, further including a lever securing a heat sink and the optical module to the seat.

16. The optoelectronic assembly as claimed in claim 15, wherein said fiber assembly is exposed to and under the protecting member.

17. The optoelectronic assembly as claimed in claim 14, wherein the interlocking portion is formed by an interlocking member which is attached upon the printed circuit board.

18. The optoelectronic assembly as claimed in claim 14, wherein said locking member is constantly urged by a spring to a locking position.

19. The optoelectronic assembly as claimed in claim 18, wherein the locking member, the protecting member and the spring share a same pivot shaft together.

* * * * *